US012718281B2

(12) United States Patent
Oki

(10) Patent No.: US 12,718,281 B2
(45) Date of Patent: Aug. 25, 2026

(54) COMPUTER-READABLE RECORDING MEDIUM STORING DISPLAY CONTROL PROGRAM, DISPLAY CONTROL APPARATUS, AND DISPLAY CONTROL SYSTEM

(71) Applicant: Fujitsu Limited, Kawasaki (JP)

(72) Inventor: Kenji Oki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 72 days.

(21) Appl. No.: 18/739,391

(22) Filed: Jun. 11, 2024

(65) Prior Publication Data

US 2025/0005648 A1 Jan. 2, 2025

(30) Foreign Application Priority Data

Jun. 30, 2023 (JP) ................................ 2023-108335

(51) Int. Cl.
*G06Q 30/0601* (2023.01)
*G06Q 10/40* (2026.01)

(52) U.S. Cl.
CPC ......... *G06Q 30/0631* (2013.01); *G06Q 10/40* (2026.01)

(58) Field of Classification Search
CPC .......................... G06Q 30/0631; G06Q 50/01
See application file for complete search history.

(56) References Cited

U.S. PATENT DOCUMENTS 7,603,350 B1 * 10/2009 Guha ................ G06F 16/24578 707/999.005
2008/0077575 A1 * 3/2008 Tateno .................... G06F 16/24 707/999.005
2008/0201373 A1 * 8/2008 Ahn ........................ G06Q 10/10
2014/0025573 A1 * 1/2014 Keronen ............. G06Q 20/322 705/41
2016/0014176 A1 * 1/2016 Ariav ...................... H04L 67/52 709/219

(Continued)

FOREIGN PATENT DOCUMENTS

JP 2008-77386 A 4/2008
JP 2011-232836 A 11/2011

OTHER PUBLICATIONS

Justice in Misinformation Detection Systems: An Analysis of Algorithms, Stakeholders, and Potential Harms (Year: 2022).*

(Continued)

*Primary Examiner* — Gautam Ubale
(74) *Attorney, Agent, or Firm* — Fujitsu Intellectual Property Center

(57) ABSTRACT

A computer-readable recording medium stores a display control program for causing a computer to execute a display control process. The display control process includes: acquiring a list of articles made public on a communication network based on a keyword input by a first user; acquiring user information on a plurality of users sympathetic to each of the acquired articles; and determining an article to be preferentially displayed from the list of the articles based on the acquired user information and information on the number of sympathetic evaluations made by third users in the plurality of users, the third users defined as users excluded from trusted user information that contains each second user trusted by the first user in the plurality of users.

9 Claims, 9 Drawing Sheets

(56) References Cited

U.S. PATENT DOCUMENTS

| | | | | |
|---|---|---|---|---|
| 2017/0220653 | A1* | 8/2017 | Korte | G06F 16/248 |
| 2018/0089323 | A1* | 3/2018 | Yan | G06F 16/9536 |
| 2019/0163794 | A1* | 5/2019 | Smith | G06F 16/24575 |
| 2019/0179861 | A1* | 6/2019 | Goldenstein | G06F 16/9535 |
| 2021/0141840 | A1* | 5/2021 | Roth | G06F 16/93 |
| 2021/0209388 | A1* | 7/2021 | Ciftci | G06N 3/045 |
| 2021/0224750 | A1* | 7/2021 | Duan | G06F 16/9535 |
| 2023/0075116 | A1* | 3/2023 | Minaudo | G06N 3/08 |

OTHER PUBLICATIONS

Political audience diversity and news reliability in algorithmic ranking (Year: 2021).*

Trust and Credibility in Web-Based Health Information A Review and Agenda for Future Research (Year: 2017).*

Examining the Impact of Provenance-Enabled Media on Trust (Year: 2023).*

White Paper, "Trustable Internet—Towards a trustable Internet in which people can use information securely", TIAL: Trusted Internet Architecture Lab., Version 1.0, pp. 1-15, [online] Oct. 13, 2022, [searched on Apr. 18, 2023], <URL:https://tial.sfc.keio.ac.jp/blob/Trustable_Internet_Whitepaper_V1.0.pdf>.

* cited by examiner

ED ISSUER ID: a2 (EVALUATOR P2)
ED ISSUANCE TARGET ID: A1 (ARTICLE DATA D1)
ARTICLE CREATOR ID: a1 (CREATOR P1)
ISSUANCE DATE AND TIME:03/07/2023/ 12:00:00
ED STORAGE URL:http://pqr.stu ---
EVALUATION ID: Posi (AFFIRMATION)
COMMENT: "ARTICLE BY CREATOR P1 IS TRUSTWORTHY"
:
DIGITAL SIGNATURE: {
a2_2023
}

61

ED ISSUER ID: a3 (EVALUATOR P3)
ED ISSUANCE TARGET ID: A1 (ARTICLE DATA D1)
ARTICLE CREATOR ID: a1 (CREATOR P1)
ISSUANCE DATE AND TIME:03/07/2023/ 12:01:00
ED STORAGE URL: http://vwx.yza...
EVALUATION ID: Nega (NEGATION)
COMMENT: "ARTICLE BY CREATOR P1 IS SUSPICIOUS"
:
DIGITAL SIGNATURE: {
a3_2023
}

62

COMPUTER-READABLE RECORDING MEDIUM STORING DISPLAY CONTROL PROGRAM, DISPLAY CONTROL APPARATUS, AND DISPLAY CONTROL SYSTEM

CROSS-REFERENCE TO RELATED APPLICATION

This application is based upon and claims the benefit of priority of the prior Japanese Patent Application No. 2023-108335, filed on Jun. 30, 2023, the entire contents of which are incorporated herein by reference.

FIELD

The embodiment discussed herein is related to a computer-readable recording medium storing a display control program, a display control apparatus, and a display control system.

BACKGROUND

A search engine system is known which displays a list of search results related to a keyword when the keyword is input to a search engine. For various communication services via a communication network represented by the Internet, a technique is known which presents some recommended products to a user among a large number of products. A technique is also known which recommends products to a target person based on friend registration in a social networking service (SNS), which products are contrary to an extension of user information on the target person.

Among data sent (for example, posted) over the Internet using an SNS and the like, some data have correct contents, while other some data have incorrect contents such as so-called disinformation. As a countermeasure against such disinformation, an architecture called Trustable Internet has been proposed.

In Trustable Internet, endorsement data is used to give an endorsement to the credibility of data on the Internet. The endorsement data includes, for example, information on an issuer who issued the endorsement data. The issuer may be a person, a public institution, or a thing (for example, a sensor or the like). In Trustable Internet, the reliability of a content expressed by data on the Internet is enhanced by associating the data with the endorsement data.

U.S. Pat. No. 7,603,350, Japanese Laid-open Patent Publication Nos. 2008-77386 and 2011-232836, and U.S. Patent Application Publication No. 2008/0201373 are disclosed as related art.

TIAL (Trusted Internet Architecture Lab), "Trustable Internet", [online], Oct. 13, 2022, [searched on Apr. 18, 2023], Internet <URL: https://tial.sfc.keio.ac.jp/blob/Trustable_Internet_Whitepaper_V1.0.pdf> is also disclosed as related art.

SUMMARY

According to an aspect of the embodiments, an computer-readable recording medium storing a display control program for causing a computer to execute a process, the process comprising: acquiring a list of articles made public on a communication network based on a keyword input by a first user; acquiring user information on a plurality of users sympathetic to each of the acquired articles; and determining an article to be preferentially displayed from the list of the articles based on the acquired user information and information on the number of sympathetic evaluations made by third users in the plurality of users, the third users defined as users excluded from trusted user information that contains each second user trusted by the first user in the plurality of users.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, to display endorsement data together with an article displayed as a search result may help a user to determine whether or not the content of the article is correct. However, if the user has to also check endorsement data every time the user checks each article, such an operation may consume time and effort. Therefore, such troublesome operation is desirably avoided when an article displayed as a search result and its endorsement data are displayed together.

For example, in a comment function of an SNS or an electronic bulletin board, feedback information such as an affirmation or a negation is given to a posted article. Therefore, one conceivable method of displaying posted articles as search results and their endorsement data together is to display them in descending order of the number of affirmations in the feedback information. However, in this case, there is a possibility that a posted article is affirmed by, for example, socially unreliable persons and is ranked at a top place in the display order. For example, there is a possibility that the article may not be affirmed by persons trusted by the user himself/herself.

When articles are displayed at higher places as the user's subjective reliability becomes higher, a specific opinion or principle may be amplified by the sympathy among persons who have a sense of values similar to that of the user and the user may misunderstand that thought similar to that of the user is correct. For example, a so-called echo chamber phenomenon may occur.

Accordingly, in one aspect, an object is to provide a display control program, a display control apparatus, and a display control system that ensure subjective reliability and objective reliability in display of articles.

Hereinafter, embodiments of the present disclosure will be described with reference to the drawings.

Figure 1:
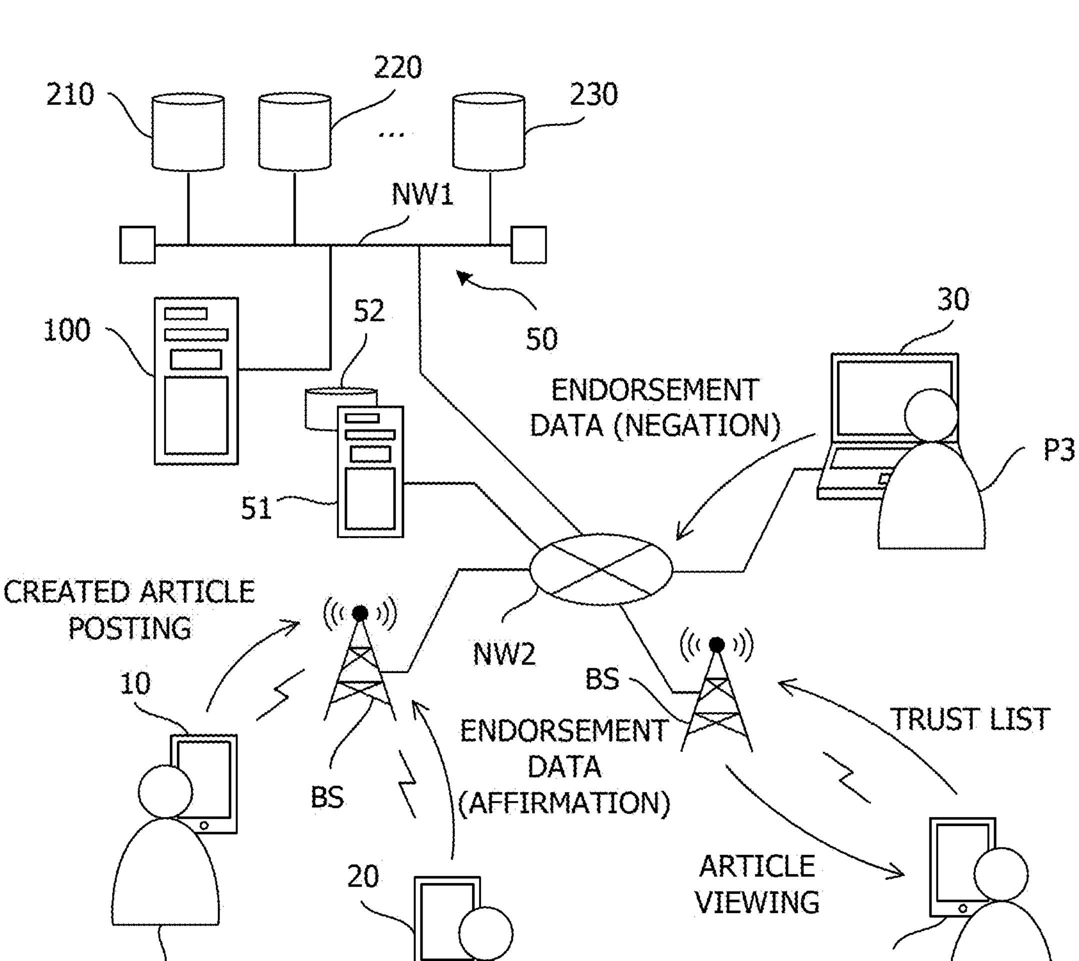
FIG. 1 is an example of a display control system.

As illustrated in FIG. 1, a display control system ST includes multiple terminal devices 10, 20, 30, and 40 and an endorsement system 50. The endorsement system 50 is a computer system including a display control server 100 and multiple data management servers 210, 220, and 230. The display control server 100 is an example of a display control apparatus. The display control server 100 and the multiple data management servers 210, 220, and 230 are coupled to each other via a communication network NW1. The communication network NW1 includes, for example, a local area network (LAN) and a wide area network (WAN). For example, the communication network NW1 may include the Internet.

The multiple terminal devices 10, 20, 30, and 40 and the endorsement system 50 are coupled to each other via a communication network NW2 and a mobile base station BS. The communication network NW2 includes, for example, the Internet. The terminal devices 10, 20, 30, and 40 include mobile terminals. Each mobile terminal may be a smartphone, a tablet terminal, or a personal computer (PC).

The terminal device 10 is operated by an article creator P1. For example, the creator P1 operates the terminal device 10 to send article data electronically containing an article concerning vaccine efficacy from the terminal device 10. Thus, the article data reaches the communication network NW2 via the mobile base station BS. Instead of the article, the creator P1 may send, from the terminal device 10, image data captured by a camera of the terminal device 10.

Figure 2:
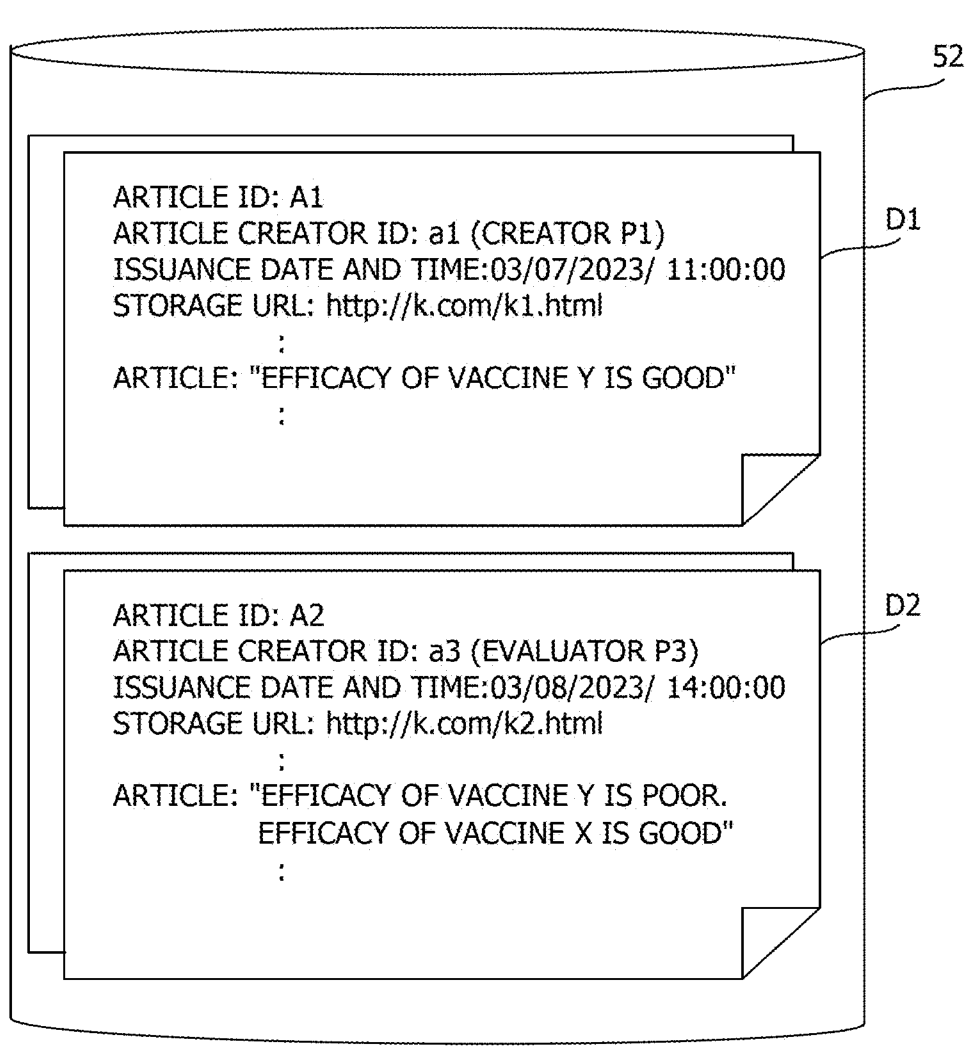
FIG. 2 is an example of article data.

A database (DB) server 51 associated with a storage 52 is coupled to the communication network NW2. As illustrated in FIG. 2, article data are accumulated in the storage 52. For example, article data D1 contains an article identifier (ID) "A1" for identifying the article data D1. The article data D1 contains an article creator ID "a1" for identifying the creator P1 who created an article. The article data D1 contains the article created by the creator P1. The article data D1 contains a uniform resource locator (URL) "http://k.com/k1.html" indicating a storage location of the article data D1.

Meanwhile, article data D2 contains an article ID "A2" for identifying the article data D2. The article data D2 contains an article creator ID "a3" for identifying an evaluator P3 who created an article, as will be described later. The article data D2 contains the article created by the evaluator P3. The article data D2 contains a URL "http://k.com/k2.html" indicating a storage location of the article data D2. The DB server 51 makes public the article data on the communication network NW2, and when receiving a search request containing a keyword, provides article data matching the keyword to a transmission source of the search request. For example, the DB server 51 may be implemented by a server that provides an SNS.

Returning to FIG. 1, the terminal devices 20 and 30 are respectively operated by evaluators P2 and P3 who evaluate contents of articles contained in article data. The terminal devices 20 and 30 are operated by the evaluators P2 and P3 to issue endorsement data giving an endorsement to the credibility of article data. Although FIG. 1 illustrates persons as examples of the evaluators P2 and P3, the evaluators P2 and P3 may be legal entities (for example, educational institutions and the like), public institutions (such as national institutions and municipalities), and persons in charge belonging to these. An issuer of the endorsement data is not limited to the evaluators P2 and P3, but may be a monitoring camera including an image sensor or the like.

Figure 3:
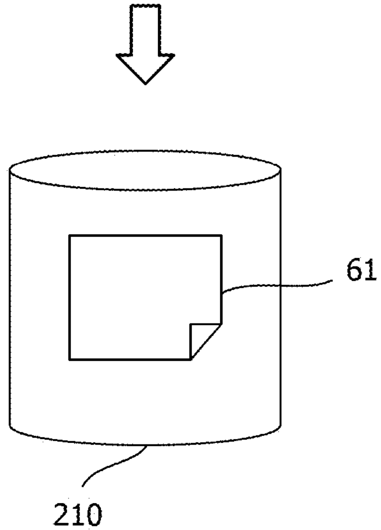
FIG. 3 is a diagram for explaining an example of endorsement data and an example of a storage thereof.

For example, as illustrated in FIG. 3, the evaluator P2 operates the terminal device 20 to send, from the terminal device 20, endorsement data 61 that affirms the article contained in the article data D1. The endorsement data 61 contains multiple items such as an endorsement data (ED) issuer ID, an ED issuance target ID, an article creator ID, and an evaluation ID. An ID according to the present embodiment includes a decentralized identifier (DID).

An identifier "a2" of the evaluator P2 who is the issuer of the endorsement data 61 is registered in the item of the ED issuer ID. The identifier "A1" of the article data D1, for which the endorsement data 61 is issued, is registered in the item of the ED issuance target ID. The identifier "a1" of the creator P1 of the article contained in the article data D1 is registered in the item of the article creator ID. An identifier "Posi" indicating an affirmation for the article contained in the article data D1 is registered in the item of the evaluation ID. The affirmation is an example of sympathy. Instead of the affirmation, an approval, an agreement, or an acceptance may be used as an example of sympathy.

As described above, the endorsement data 61 that affirms the article created by the creator P1 is associated with the article data D1 via the identifiers. As illustrated in FIG. 3, the endorsement data 61 reaches the communication network NW1 via the mobile base station BS and the communication network NW2, and is stored in, for example, the data management server 210. As a result, the data management server 210 manages the endorsement data 61.

Figure 4:
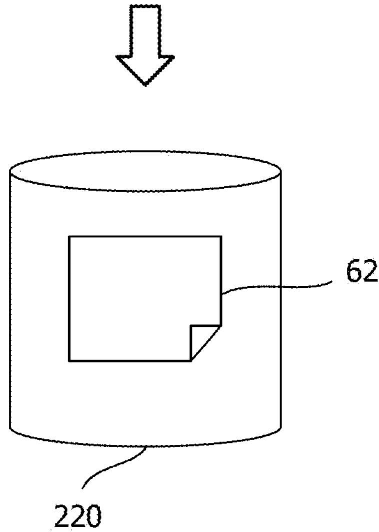
FIG. 4 is a diagram for explaining another example of endorsement data and an example of a storage thereof.

As illustrated in FIG. 4, the evaluator P3 operates the terminal device 30 to send, from the terminal device 30, endorsement data 62 that negates the article contained in the article data D1. The endorsement data 62 contains basically the same items as the multiple items contained in the endorsement data 61. For example, an identifier "Nega" indicating a negation for the article contained in the article data D1 is registered in the item of the evaluation ID. Instead of a negation, an opposition may be adopted.

As described above, the endorsement data 62 that negates the article created by the creator P1 is also associated with the article data D1 via the identifiers. As illustrated in FIG. 4, the endorsement data 62 reaches the communication network NW1 via the mobile base station BS and the communication network NW2, and is stored in, for example, the data management server 220. As a result, the data management server 220 manages the endorsement data 62. As described above, the endorsement data 61 and the endorsement data 62 are distributed to and individually managed by the data management servers 210 and 220.

Returning to FIG. 1, the terminal device 40 is operated by a viewer P4 who views the article contained in the article data D1. In a case where the viewer P4 views the article in the article data D1, the viewer P4 operates the terminal device 40 to input, for example, keywords "vaccine" and "efficacy" to a browser. In response to this, the terminal device 40 transmits a search request containing these keywords.

As will be described later in detail, this search request reaches the DB server 51 via the display control server 100. For example, upon receiving the search request, the display control server 100 transfers the received search request to the DB server 51. Upon receiving the search request, the DB server 51 extracts, from the storage 52, a list of multiple article data including the article data D1 and D2 matching the keywords contained in the search request. The DB server 51 provides the extracted list of the multiple article data including the article data D1 and D2 to the display control server 100.

Consequently, the display control server 100 acquires the list of the multiple article data including the article data D1 and D2. After acquiring the list of the article data, the display control server 100 acquires a trust list from the terminal device 40 as illustrated in FIG. 1. The trust list is an example of trusted user information, and includes identifiers of the creator P1, the evaluator P2, and so on trusted by the viewer P4. For example, when the creator P1 is an expert who is familiar with vaccines and the evaluator P2 is a public institution such as the Ministry of Health, Labor, and Welfare, the viewer P4 may trust the creator P1 and the evaluator P2.

After acquiring the trust list, the display control server 100 executes various processes by using the list of the article data D1, D2, and so on, the trust list, the endorsement data 61, 62, and so on, and displays some articles on the terminal device 40. For example, the display control server 100 displays an article having high reliability for the viewer P4. For example, the display control server 100 displays, on the terminal device 40, an article for which the subjective reliability of the viewer P4 is ensured.

Together with the above article, the display control server 100 also displays an article for which the subjective reliability is not high but the objective reliability is high. For example, at the same time, the display control server 100 displays, on the terminal device 40, an article for which the objective reliability less affected by the principles of the viewer P4 is ensured. Such displaying of articles having the two types of reliability opposing to each other suppresses the occurrence of the echo chamber phenomenon while reflecting the preferences of the viewer P4. Although the display control server 100 actually displays not an article itself but a URL that is link information to the article data, the following description will be basically given on the assumption that an article is displayed.

Figure 5:
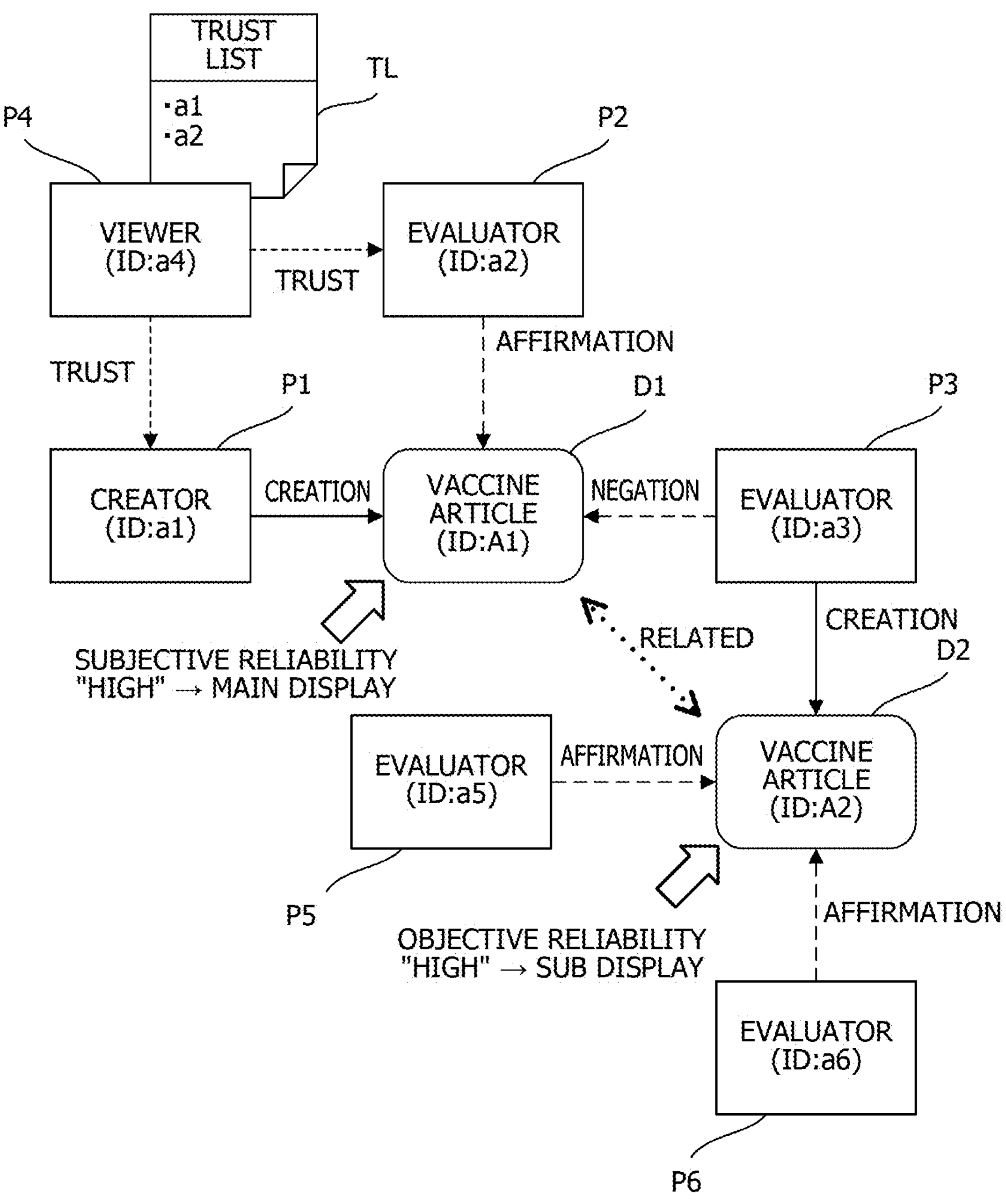
FIG. 5 is an example of a correlation diagram of article data together with a personal relationship.

With reference to FIG. 5, description will be given of a correlation between the article data D1 and D2 together with a personal relationship among the creator P1, the evaluators P2 and P3, and the viewer P4. FIG. 5 illustrates evaluators P5 and P6 that are omitted in FIG. 1. The viewer P4 is an example of a first user, the evaluator P2 is an example of a second user, and the evaluators P5 and P6 are an example of a third user. Accordingly, the evaluators P2, P5, and P6 are an example of multiple users.

First, as described above, the article in the article data D1 is created by the creator P1. The article data D1 is given and associated with the affirmative endorsement data 61 issued by the evaluator P2. On the other hand, the article data D1 is given and associated with the negative endorsement data 62 issued by the evaluator P3.

A trust list TL is associated with the viewer P4. For example, the terminal device 40 of the viewer P4 possesses the trust list TL, and thus the trust list TL is associated with the viewer P4. The viewer P4 trusts the creator P1 and the evaluator P2. For this reason, the identifier "a1" of the creator P1 and the identifier "a2" of the evaluator P2 are defined or stored in the trust list TL.

The article in the article data D2 is created by the evaluator P3. For example, the evaluator P3 negates the article (for example, the content of the article) in the article data D1 on one hand, and creates another article different from the article in the article data D1 on the other hand. The article data D2 containing this different article is given and associated with affirmative endorsement data (not illustrated) issued by the evaluators P5 and P6.

In the case where the evaluator P3 negates the article in the article data D1 on one hand and creates the other article different from the article in the article data D1 on the other hand as described above, the display control server 100 determines that the article data D2 and the article data D1 are related to each other. As a result of scraping the article contained in the article data D2, the display control server 100 finds that a URL identifying the article data D1 is written in the scraped article in some cases. There is a case where the scraped article contains a word that suspects the article in the article data D1. In such a case, the display control server 100 determines that the article data D2 and the article data D1 are related to each other.

Whether or not there is a word that suspects an article may be determined by using a technique for estimating a standpoint (such as affirmation/negation) of a poster or a speaker on an SNS concerning a specific topic, which technique is referred to as "stance detection". Instead of scraping, the display control server 100 may perform scanning, optical character recognition (OCR) processing, or the like.

By performing various processes to be described later, the display control server 100 determines that the article data D1 contains the article having high subjective reliability of the viewer P4, and displays the article in the article data D1 as a first article on the terminal device 40 at a main position (illustrated as a main display in FIG. 5). At this time, the display control server 100 determines that the article data D2 contains the article for which the objective reliability judged by the evaluators P5 and P6 is high, and displays the article in the article data D2 as a second article on the terminal device 40 at a sub position (illustrated as a sub display in FIG. 5). Thus, the article of the article data D2 is displayed as a noteworthy article in an attention-drawing manner preferentially over articles for which both of the subjective reliability and the objective reliability are low. As a result, the viewer P4 may visually recognize both of the articles in the article data D1 and D2 at the same time.

Figure 6:
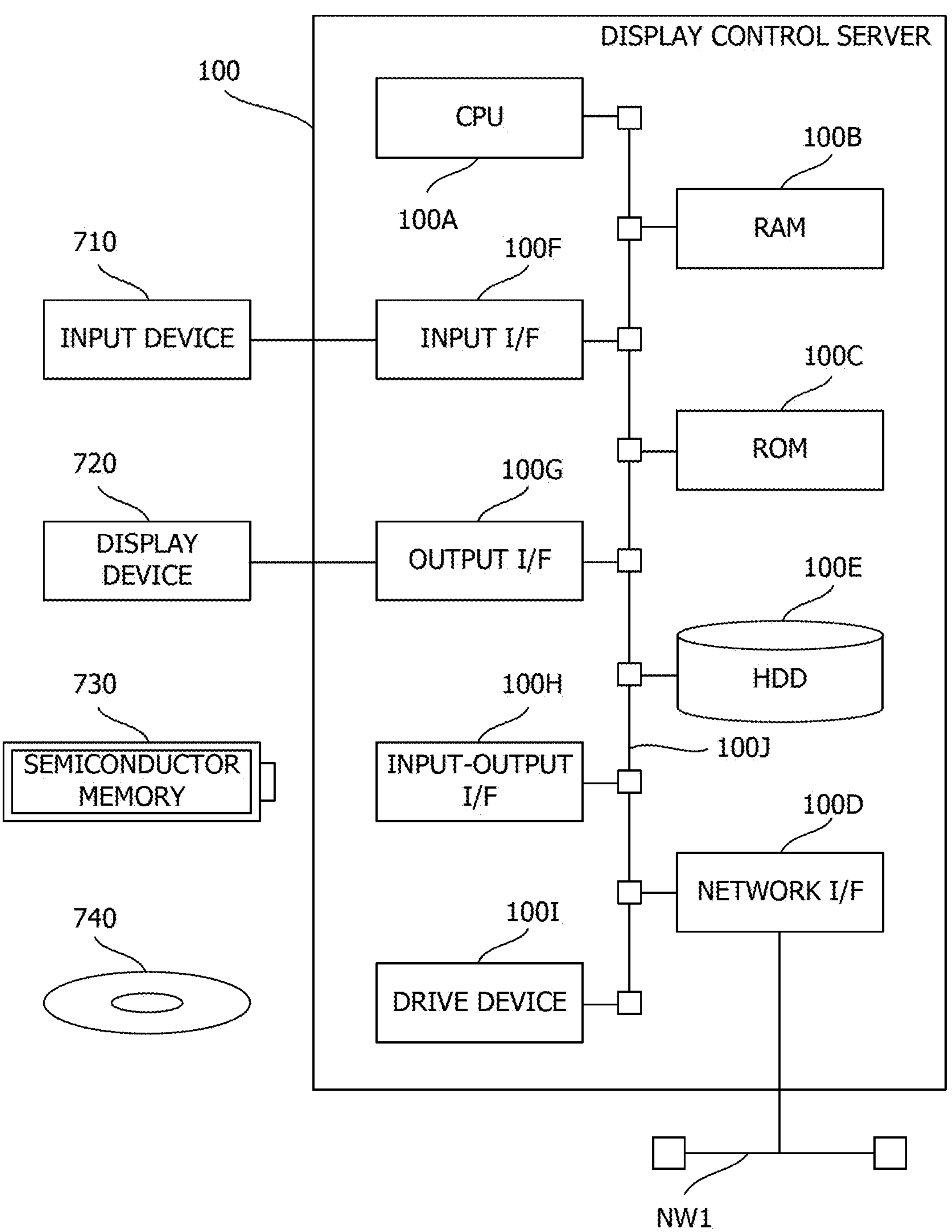
FIG. 6 is an example of a hardware configuration of a display control server.

Next, a hardware configuration of the display control server 100 will be described with reference to FIG. 6. Since the terminal devices 10, 20, 30, and 40, the DB server 51, and the data management servers 210, 220, and 230 described above basically have the same hardware configuration as that of the display control server 100, detailed description thereof will be omitted.

The display control server 100 includes a central processing unit (CPU) 100A as a processor, and a random-access memory (RAM) 100B, and a read-only memory (ROM) 100C as memories. The RAM 100B includes a dynamic RAM (DRAM) and a static RAM (SRAM). The SRAM may be included in the CPU 100A. The display control server 100 also includes a network interface (I/F) 100D and a hard disk drive (HDD) 100E. The display control server 100 may include a solid state drive (SSD) instead of the HDD 100E.

The display control server 100 may include, as desired, at least one of an input I/F 100F, an output I/F 100G, an input-output I/F 100H, and a drive device 100I. The CPU 100A to the drive device 100I are coupled to one another via an internal bus 100J. For example, the display control server 100 may be implemented by a computer.

An input device 710 is coupled to the input I/F 100F. Examples of the input device 710 include a keyboard, a mouse, a touch panel, and the like. A display device 720 is coupled to the output I/F 100G. An example of the display device 720 is a liquid crystal display or the like. A semiconductor memory 730 is coupled to the input-output I/F 100H. Examples of the semiconductor memory 730 include a Universal Serial Bus (USB) memory, a flash memory, and the like. The input-output I/F 100H reads a display control program stored in the semiconductor memory 730. For example, the input I/F 100F and the input-output I/F 100H include USB ports. For example, the output I/F 100G includes a display port.

A portable-type recording medium 740 is inserted into the drive device 100I. Examples of the portable-type recording medium 740 include removable discs such as a compact disc (CD)-ROM and a Digital Versatile Disc (DVD). The drive device 100I reads the display control program recorded in the portable-type recording medium 740. For example, the network I/F 100D includes a LAN port, a communication circuit, and the like. The communication circuit includes any one or both of a wired communication circuit and a wireless communication circuit. The network I/F 100D is coupled to the communication network NW1.

The display control program stored in at least one of the ROM 100C, the HDD 100E, and the semiconductor memory 730 is temporarily stored in the RAM 100B by the CPU 100A. The display control program recorded in the portable-type recording medium 740 is temporarily stored in the RAM 100B by the CPU 100A. Executing the stored display control program, the CPU 100A achieves various functions to be described later and executes a display control method including various processes to be described later. The display control program may be configured according to a flowchart to be described later.

Figure 7:
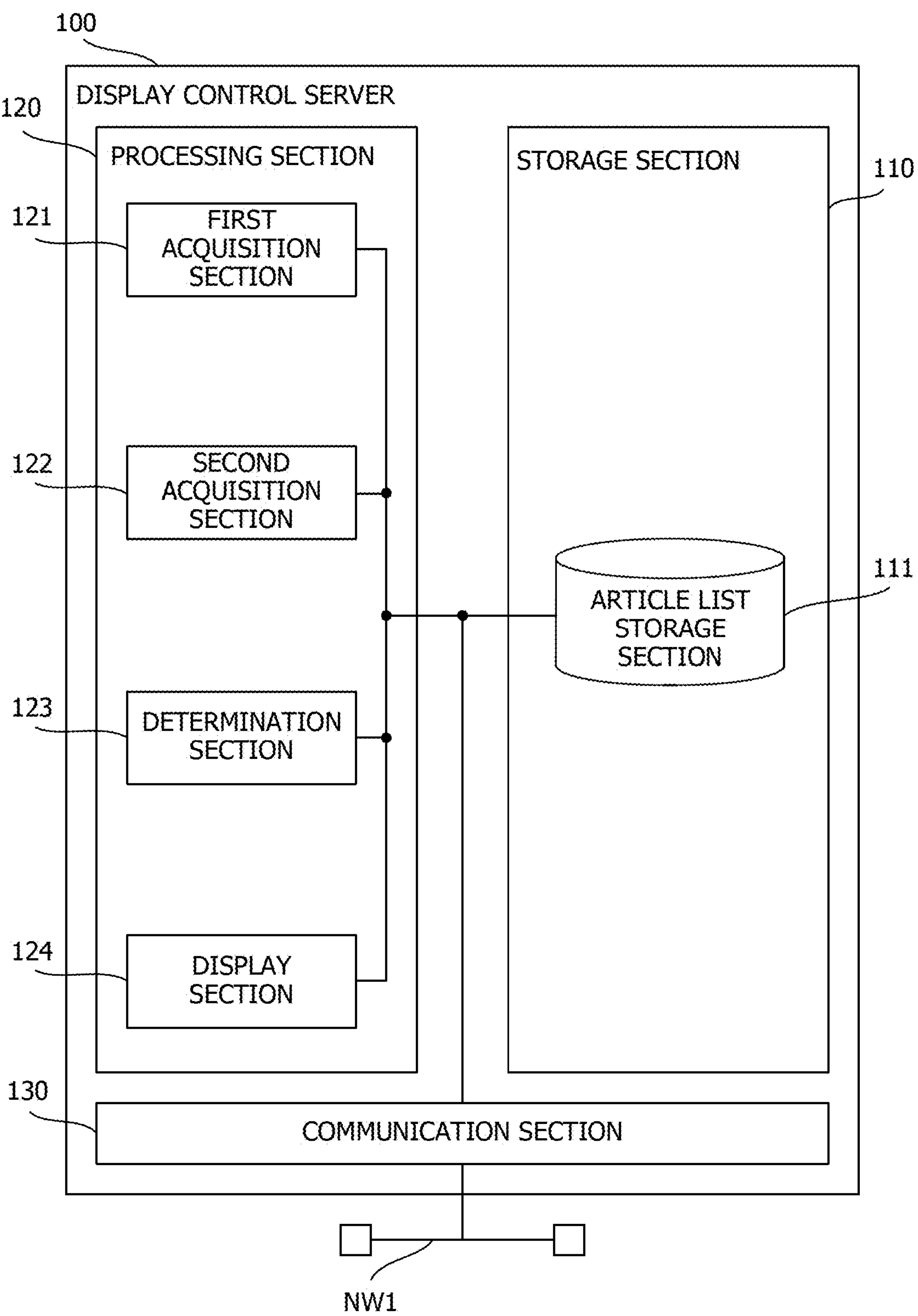
FIG. 7 is an example of a functional configuration of the display control server.

With reference to FIG. 7, a functional configuration of the display control server 100 will be described. FIG. 7 illustrates main sections of functions of the display control server 100.

As illustrated in FIG. 7, the display control server 100 includes a storage section 110, a processing section 120, and a communication section 130. The storage section 110 may be implemented by any one or both of the RAM 100B and the HDD 100E described above. The processing section 120 may be implemented by the CPU 100A described above. The communication section 130 may be implemented by the network I/F 100D described above. The storage section 110, the processing section 120, and the communication section 130 are coupled to one another. For example, the storage section 110 includes an article list storage section 111. The processing section 120 includes a first acquisition section 121, a second acquisition section 122, a determination section 123, and a display section 124.

The first acquisition section 121 acquires a list of multiple article data including the article data D1 and D2. For example, the first acquisition section 121 receives a search request transmitted from the terminal device 40. Upon receiving the search request, the first acquisition section 121 transfers the search request to the DB server 51. Upon receiving the search request, the DB server 51 extracts a list of article data matching keywords contained in the search request from the storage 52, and transmits the list to the display control server 100. As a result, the first acquisition section 121 acquires the list of the article data. After acquiring the list of the article data, the first acquisition section 121 stores the list of the article data in the article list storage section 111. As a result, the article list storage section 111 stores the list of the multiple article data including the article data D1 and D2 matching the keywords from among various article data stored in the storage 52 (see FIG. 2). After storing the list of the article data in the article list storage section 111, the first acquisition section 121 acquires the trust list TL (see FIG. 5) from the terminal device 40.

For each article data in the list acquired by the first acquisition section 121, the second acquisition section 122 acquires evaluator information on multiple evaluators who affirmed the article data. For example, the second acquisition section 122 extracts the list of the article data from the article list storage section 111, and acquires the endorsement data for each article data in the extracted list. Based on the acquired endorsement data, the second acquisition section 122 identifies the evaluator information on the multiple evaluators who affirmed the article in each article data. For example, the article data D1 is affirmed or negated by the endorsement data 61 or 62. The identifier "a2" of the evaluator P2 is registered as the evaluator information in the endorsement data 61. For this reason, the endorsement data 61 is equivalent to the user information. Endorsement data issued by the evaluators P5 and P6 are similar to the endorsement data 61. The article data D1 and D2 are affirmed by the multiple evaluators P2, P5, and P6 (see FIG. 5). For this reason, the second acquisition section 122 acquires the endorsement data issued by the multiple evaluators P2, P5, and P6.

The determination section 123 determines article data containing an article to be preferentially displayed from the list of the multiple article data including the article data D1 and D2. For example, the determination section 123 determines the article data based on the endorsement data acquired by the second acquisition section 122 and information on the number of affirmations made by the evaluators P5 and P6 who are excluded from the trust list TL.

As described above, the trust list TL includes the identifier "a2" of the evaluator P2 trusted by the viewer P4, but does not include each of identifiers of the evaluators P5 and P6 (see FIG. 5). For example, the evaluators P5 and P6 are excluded from the trust list TL. For this reason, in the present embodiment, the article data D2 is determined from the list of the multiple article data based on the evaluator information on the evaluators P2, P5, and P6 and the information on the number of the affirmations made by the evaluators P5 and P6.

The display section 124 displays article data containing an article affirmed by an evaluator trusted by the viewer and article data containing an article created by a creator trusted by the viewer at top places in the display order. For example, the display section 124 displays article data containing an article having the highest subjective reliability of the viewer at a top place in the display order.

When displaying the article data having high subjective reliability, the display section 124 displays article data determined by the determination section 123 in association with the article having high subjective reliability. For example, the display section 124 also together displays the article data containing an article having high objective reliability. For example, in the present embodiment, the display section 124 displays the article data D1 as article data containing an article having high subjective reliability, and displays the article data D2 as article data containing an article having high objective reliability beside the article data D1. For example, the display section 124 may display the URL of the article data D2 below the URL of the article data D1 or to the right of the URL of the article data D1. By displaying the URL of the article data D2 on the terminal device 40, the viewer P4 may notice the article data D2 as a noteworthy article related to the article data D1.

Figure 8:
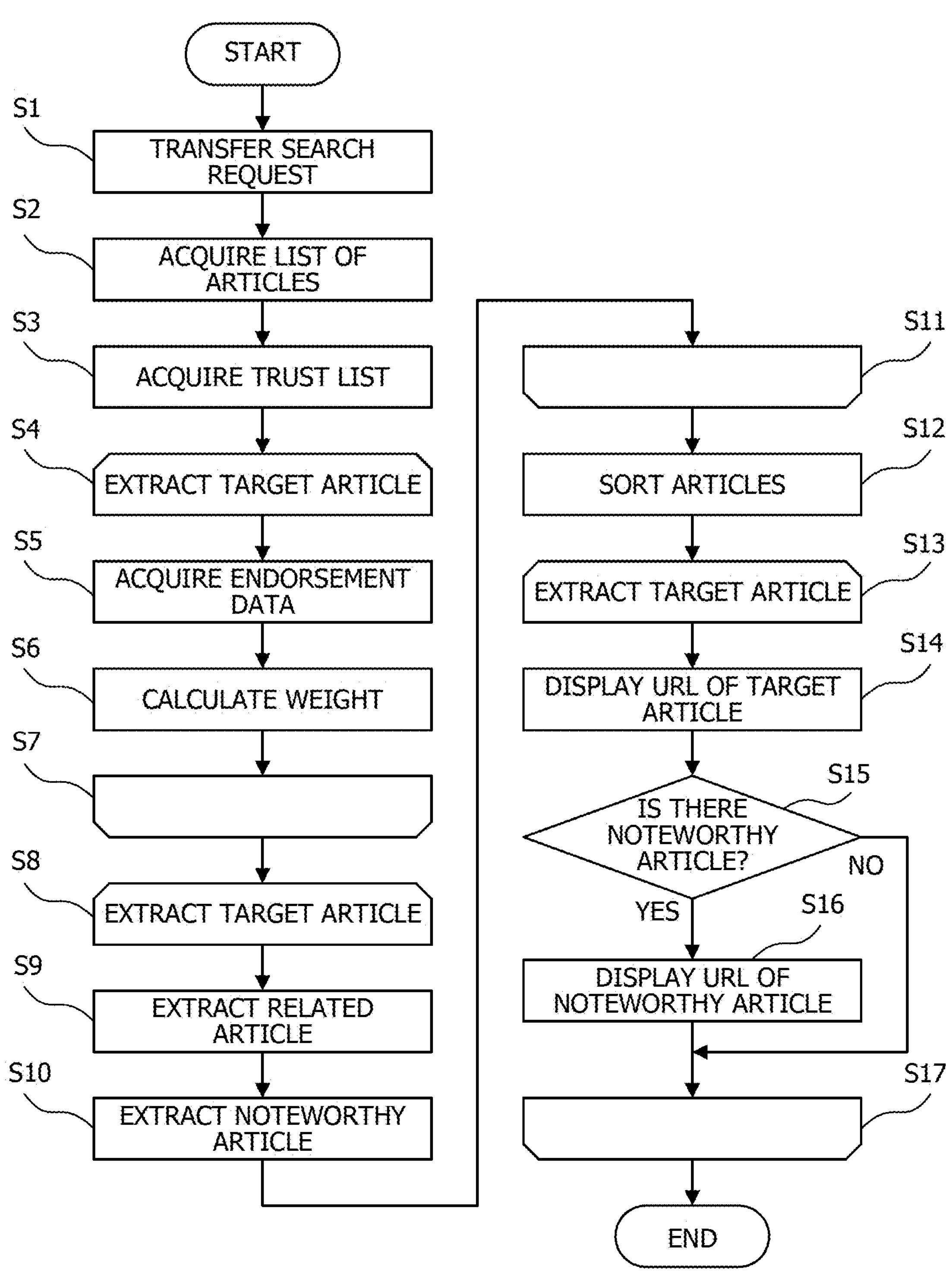
FIG. 8 is a flowchart illustrating an example of an operation of the display control server.

With reference to FIG. 8, the various processes executed by the display control server 100 will be described.

As illustrated in FIG. 8, when a search request containing keywords is transmitted from the terminal device 40, the first acquisition section 121 receives the search request and transfers the search request to the DB server 51 (step S1). As described above, the DB server 51 transmits a list of article data extracted in accordance with the keywords contained in the search request to the display control server 100. Accordingly, the first acquisition section 121 acquires the list of the article data (step S2). After acquiring the list of the article data, the first acquisition section 121 stores the list in the article list storage section 111 and acquires the trust list TL from the terminal device 40 (step S3).

After the first acquisition section 121 acquires the trust list TL, the second acquisition section 122 starts a first loop process (step S4). For example, the second acquisition section 122 extracts any one article data from the article list storage section 111 as a target article for the loop process, and starts the first loop process. After starting the first loop process, the second acquisition section 122 acquires the endorsement data associated with the target article (step S5). For example, when the second acquisition section 122 extracts the article data D1 from the article list storage section 111, the second acquisition section 122 acquires the endorsement data 61 and 62 from the respective data management servers 210 and 220 (see FIGS. 3 and 4).

After acquiring the endorsement data, the second acquisition section 122 calculates a weight of the target article (step S6). For example, the second acquisition section 122 calculates the weight of the target article based on the trust list TL and the endorsement data. For example, if the identifier registered in the item of the article creator ID of the endorsement data is present in the trust list TL, the second acquisition section 122 adds a first weight α to an initial weight of the target article (for example, an initial weight "0"). The first weight α is a positive numerical value set in advance. In the present embodiment, for example, a numerical value "1" is adopted as the first weight α.

If the identifier of the evaluator registered in the item of the ED issuer ID of the endorsement data is present in the trust list TL and the identifier "Posi" indicating an affirmation is registered in the item of the evaluation ID, the second acquisition section 122 adds a second weight β to the initial weight of the target article. If the identifier of the evaluator registered in the item of the ED issuer ID of the endorsement data is included in the trust list TL and the identifier "Nega" indicating a negation is registered in the item of the evaluation ID, the second acquisition section 122 subtracts the second weight β from the initial weight of the target article. The second weight β is a positive numerical value set in advance. In the present embodiment, for example, a numerical value "1" is adopted as the second weight β.

Accordingly, if the second acquisition section 122 extracts the article data D1 and acquires the endorsement data 61 and 62, the second acquisition section 122 calculates "2" as the weight of the target article. For example, since the identifier "a1" registered in the item of the article creator ID in the endorsement data 61 is present in the trust list TL (see FIGS. 3 and 5), the second acquisition section 122 adds the first weight "1" to the initial weight "0" of the target article. Since the identifier "a2" of the evaluator registered in the item of the ED issuer ID of the endorsement data 61 is present in the trust list TL (see FIGS. 3 and 5) and the identifier "Posi" indicating an affirmation is registered in the item of the evaluation ID, the second acquisition section 122 adds the second weight "1" to the initial weight "0" of the target article. As a result, the second acquisition section 122 calculates "2" as the weight of the target article. For example, the weight "2" is assigned to the article data D1.

After calculating the weight, the second acquisition section 122 ends the first loop process (step S7). Subsequently, the second acquisition section 122 starts the first loop process again by extracting another article data from the article list storage section 111 as a target article for the loop process. For example, if the second acquisition section 122 extracts the article data D2 from the article list storage section 111, the second acquisition section 122 acquires each of the endorsement data (not illustrated) of the evaluators P5 and P6 from, for example, the data management server 230 or the like.

For example, if the second acquisition section 122 extracts the article data D2 and acquires the endorsement data of the evaluators P5 and P6 related to the article data D2, the second acquisition section 122 calculates "0" as the weight of the target article. For example, since the article in the article data D2 is created by the evaluator P3, the identifier "a3" is registered in the item of the article creator ID in each of the endorsement data of the evaluators P5 and P6 acquired by the second acquisition section 122. This identifier "a3" is not present in the trust list TL (see FIG. 5). For this reason, the second acquisition section 122 keeps the initial weight "0" of the target article without adding the first weight "1" thereto.

The identifier "a5" of the evaluator P5 is registered in the item of the ED issuer ID of the endorsement data of the evaluator P5. Similarly, the identifier "a6" of the evaluator P6 is registered in the item of the ED issuer ID of the endorsement data of the evaluator P6. Both of the two identifiers "a5" and "a6" are not present in the trust list TL (see FIG. 5). For this reason, the second acquisition section 122 keeps the initial weight "0" of the target article without adding the second weight "1" thereto. As a result, the second acquisition section 122 calculates "0" as the weight of the target article. For example, the weight "0" is assigned to the article data D2. As described above, the second acquisition section 122 acquires the endorsement data 61 and so on of the multiple evaluators P2, P5, and P6, and calculates the weights of the article data D1 and D2.

After the second acquisition section 122 completes the execution of the first loop process on all the article data in the list, the determination section 123 starts a second loop process (step S8). For example, the determination section 123 extracts any one article data from the article list storage section 111 as a target article for the loop process, and starts the second loop process. After starting the second loop process, the determination section 123 extracts a related article negatively related to the target article (step S9).

For example, if the article data D1 is extracted as the target article and the evaluator P3 who is the creator of the article in the article data D2 negates the article in the article data D1 (see FIG. 5), the determination section 123 determines that the article data D2 is negatively related to the target article. The determination section 123 extracts this article data D2 as a related article. As described above, the determination section 123 may extract the related article by performing scraping or the like, or may extract the related article by using both of these two extraction methods.

After the related articles are extracted, the determination section 123 extracts a noteworthy article (step S10). For example, the determination section 123 determines and extracts, as a noteworthy article, a specific related article having a noteworthy relationship with the target article from the related articles. For example, the determination section 123 narrows down the related articles to some articles. For example, if article data with the weight "0" or less assigned is related to article data with a positive weight assigned, and also if the number of affirmations in the endorsement data for the article data with the weight "0" or less assigned exceeds a threshold y, the determination section 123 determines that the related article has a noteworthy relationship with the target article.

In the present embodiment, the article data D1 with the positive weight "2" assigned is negatively related to the article data D2 with the weight "0" assigned. For this reason, in the case where the threshold y is set to, for example, a numerical value "1" in advance, the determination section 123 determines that the article data D2 has a noteworthy relationship with the article data D1 because the number of affirmations based on each endorsement data of evaluators P5 and p6 who affirmed the article in the article data D2 is "2". As a result, the determination section 123 determines and extracts the article data D2 as a noteworthy article. After extracting the noteworthy article, the determination section 123 ends the second loop process (step S11).

Subsequently, the determination section 123 starts the second loop process again by extracting another article data from the article list storage section 111 as a target article for the loop process.

As described above, the determination section 123 determines a noteworthy article to be preferentially displayed from the list of the article data, based on the endorsement data 61 and so on of the evaluators P2, P5, and P6 acquired by the second acquisition section 122 and the information on the number of affirmations made by the evaluators P5 and P6 excluded from the trust list TL. For example, since the list of the article data contains articles to be excluded from noteworthy articles, the determination section 123 determines a noteworthy article to be displayed preferentially over such articles.

After the determination section 123 completes the execution of the second loop process on all the article data in the list, the display section 124 sorts the article data in descending order of the weight (step S12). As a result, for example, the article data D1 is sorted at a higher place than that of the article data D2. After sorting the article data, the display section 124 starts a third loop process (step S13). For example, the display section 124 extracts the article data at the first top place among the sorted article data as a target article for the loop process, and starts the third loop process.

After starting the third loop process, the display section 124 displays the URL of the target article on the screen of the terminal device 40 (step S14). After displaying the URL of the target article, the display section 124 determines whether or not there is a noteworthy article (step S15). If there is a noteworthy article (step S15: YES), the display section 124 displays the URL of the noteworthy article on the screen of the terminal device 40 (step S16). On the other hand, if there is no noteworthy article (step S15: NO), the display section 124 skips a process in step S16.

After displaying the URL of the noteworthy article or skipping the process in step S16, the display section 124 ends the third loop process (step S17). Subsequently, the display section 124 starts the third loop process again by extracting the article data at the second top place among the sorted article data as a target article for the loop process. When there are no more target articles for the third loop process, the display section 124 ends the process. As a result of the above-described processes, the URL to the article in the article data D1 is displayed on the screen of the terminal device 40, and the URL to the article in the article data D2 is displayed as the URL to the noteworthy article below the URL to the article in the article data D1.

Figure 9:
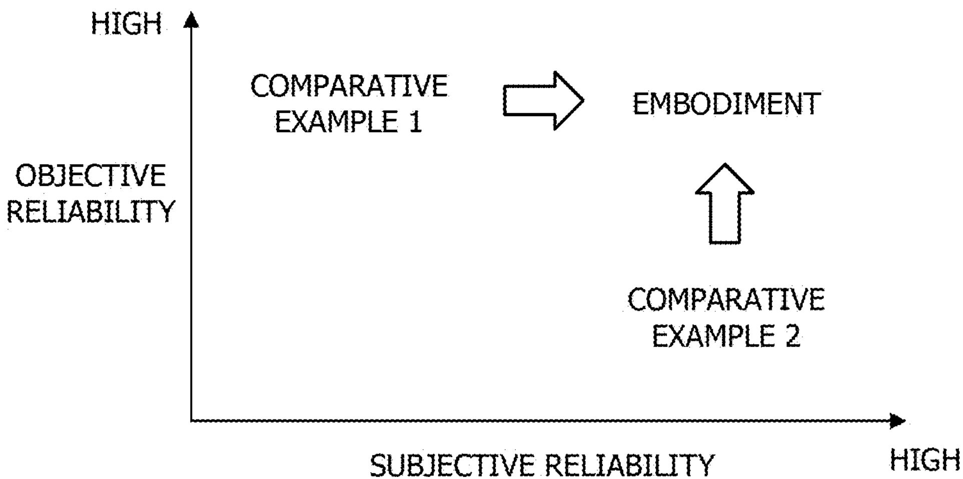
FIG. 9 is a diagram illustrating an effect of an embodiment.

With reference to FIG. 9, an effect of the embodiment will be described in comparison with Comparative Examples 1 and 2.

Comparative Example 1 is an example in which articles are displayed in descending order of the number of affirmations regardless of whether or not each person involved is trusted by the viewer. In this case, since various evaluators evaluate an article, the objective reliability may be high. However, there is a possibility that the article is affirmed by socially unreliable persons. For this reason, the article may not be affirmed by persons trusted by the viewer himself/herself, and therefore may have low subjective reliability.

Comparative Example 2 is an example in which articles are displayed with priority given to persons trusted by the viewer. In this case, an article is displayed at a top place based on the persons trusted by the viewer himself/herself. For this reason, there is a high possibility that a specific opinion or principle for which the viewer's subjective reliability is high may be amplified by the sympathy among persons having a sense of values similar to that of the viewer, and the viewer may misunderstand that thought similar to that of the viewer is correct. For example, in Comparative Example 2, the echo chamber phenomenon may occur.

In the present embodiment, in the display of articles, an article created by a creator trusted by a viewer and an article affirmed by an evaluator trusted by the viewer in a list of articles matching keywords input by the viewer are displayed at top places, unlike Comparative Examples 1 and 2. This ensures the subjective reliability of the viewer. Meanwhile, if an article created by a person other than the viewer is affirmed by a third party unrelated to the reliability of the viewer regardless of whether or not the person is trusted by the viewer, this article is displayed as a noteworthy article because the article is related to the above article. This ensures the objective reliability. As described above, according to the present embodiment, it is possible to ensure the subjective reliability and the objective reliability in display of articles.

Although the preferred embodiment of the present disclosure has been described above in detail, the present disclosure is not limited to specific embodiments according to the present disclosure, and various modifications and changes may be made within a scope of the gist of the present disclosure described in the claims. For example, although the first weight $\alpha$ and the second weight $\beta$ are the same numerical values in the above-described embodiment, the first weight $\alpha$ and the second weight $\beta$ may be different numerical values.

For example, a famous authority in particular among persons defined in the trust list TL may be ranked as a special person in the trust list TL, and the first weight $\alpha$ regarding the special person may be increased to twice. The first weight $\alpha$ is added only once for one creator in many cases, whereas the second weight $\beta$ is added as many times as the number of endorsement data. For this reason, there is a possibility of the influence of the first weight $\alpha$ decreasing. To address this, in a case where there is a large number of endorsement data, the influence of the second weight $\beta$ may be reduced by increasing the numerical value of the first weight $\alpha$.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a display control program for causing a computer to execute a process, the process comprising:

acquiring a list of articles made public on a communication network based on a keyword input by a first user;

acquiring, for each of the articles, endorsement data that gives an endorsement to credibility of each of the articles, the endorsement data including an issuer identifier of a user who issued the endorsement data and an evaluation identifier indicating an affirmation;

calculating, for each of the articles, a subjective reliability score based on a comparison between trusted user information, which contains each second user trusted by the first user, and the issuer identifiers included in the endorsement data associated with the article;

identifying a first article from the list of articles based on the calculated subjective reliability score;

determining, from remaining articles in the list of articles that are related to the first article, a second article to be preferentially displayed from the list of the articles based on a count of endorsement data items that contain the evaluation identifier indicating affirmation and are made by third users in the plurality of users, the third users being defined as users excluded from trusted user information; and generating a display instruction to present link information for the identified first article and link information for the determined second article concurrently on a terminal device of the first user, thereby presenting the first user with both a subjectively reliable article and an objectively popular contradictory article to mitigate an echo chamber effect.

2. The non-transitory computer-readable recording medium according to claim 1, wherein in the determining, determining a first article to be preferentially presented to the first user from the list of the articles based on the trusted user information and the information on the number of sympathetic evaluations made by the second users, and determining a second article to be preferentially presented to the first user from the list of the articles based on the acquired user information and the information on the number of the sympathetic evaluations made by the third users.

3. The non-transitory computer-readable recording medium according to claim 1, wherein the process further comprising calculating a weight of each of the acquired articles based on the trusted user information and a descending order of the number of sympathetic evaluations made by the second users, uniquely determining a first article to be presented to the first user from the list of the articles based on the calculated weight, and determining a second article to be preferentially displayed from the list of the articles from which the first article is excluded, based on the acquired user information and a descending order of the number of the sympathetic evaluations made by the third users.

4. The non-transitory computer-readable recording medium according to claim 1, wherein the process further comprising acquiring other user information on users who negate each of the acquired articles, and determining an article to be displayed from the list of the articles based on the acquired other user information.

5. The non-transitory computer-readable recording medium according to claim 1, wherein the process further comprising, in a case where a certain article among the acquired articles is negated in an article different from the certain article or by a creator of the different article based on predetermined information indicating a negation, extracting the different article as a related article related to the certain article, and determining an article to be preferentially displayed from the list of the articles based on the related article, the acquired user information, and the information on the number of the sympathetic evaluations made by the third users.

6. The non-transitory computer-readable recording medium according to claim 1, wherein the process further comprising acquiring the user information on the plurality of users sympathetic to each of the acquired articles, based on endorsement data that gives an endorsement to credibility of each of the articles on the communication network.

7. The non-transitory computer-readable recording medium according to claim 2, wherein the process further comprising displaying link information to the determined first article and link information to the determined second article side by side on a terminal device operated by the first user.

8. A display control apparatus comprising:

a memory, and a processor coupled to the memory and configured to:

acquire a list of articles made public on a communication network based on a keyword input by a first user;

acquire, for each of the articles, endorsement data that gives an endorsement to credibility of each of the articles, the endorsement data including an issuer identifier of a user who issued the endorsement data and an evaluation identifier indicating an affirmation;

calculate, for each of the articles, a subjective reliability score based on a comparison between trusted user information, which contains each second user trusted by the first user, and the issuer identifiers included in the endorsement data associated with the article;

identify a first article from the list of articles based on the calculated subjective reliability score;

determine, from remaining articles in the list of articles that are related to the first article, a second article to be preferentially displayed from the list of the articles based on count of endorsement data items that contain the evaluation identifier indicating affirmation and are made by third users in the plurality of users, the third users being defined as users excluded from trusted user information; and generate a display instruction to present link information for the identified first article and link information for the determined second article concurrently on a terminal device of the first user, thereby presenting the first user with both a subjectively reliable article and an objectively popular contradictory article to mitigate an echo chamber effect.

9. A display control system comprising:

a terminal device to which a keyword is input by a first user;

a display controller coupled to the terminal device and configured to:

acquire a list of articles made public on a communication network based on the keyword;

acquire, for each of the articles, endorsement data that gives an endorsement to credibility of each of the articles, the endorsement data including an issuer identifier of a user who issued the endorsement data and an evaluation identifier indicating an affirmation;

calculate, for each of the articles, a subjective reliability score based on a comparison between trusted user information, which contains each second user trusted by the first user, and the issuer identifiers included in the endorsement data associated with the article;

identify a first article from the list of articles based on the calculated subjective reliability score;

determine, from remaining articles in the list of articles that are related to the first article, a second article to be preferentially displayed from the list of the articles based on count of endorsement data items that contain the evaluation identifier indicating affirmation and are made by third users in the plurality of users, the third users being defined as users excluded from trusted user information; and generate a display instruction to present link information for the identified first article and link information for the determined second article concurrently on a terminal device of the first user, thereby presenting the first user with both a subjectively reliable article and an objectively popular contradictory article to mitigate an echo chamber effect.

* * * * *